(12) United States Patent
Ryu et al.

(10) Patent No.: US 7,365,482 B2
(45) Date of Patent: Apr. 29, 2008

(54) FIELD EMISSION DISPLAY INCLUDING ELECTRON EMISSION SOURCE FORMED IN MULTI-LAYER STRUCTURE

(75) Inventors: Mee-Ae Ryu, Suwon (KR);
Hun-Young Kim, Seoul (KR);
Joong-Woo Nam, Suwon (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 220 days.

(21) Appl. No.: 10/684,520

(22) Filed: Oct. 15, 2003

(65) Prior Publication Data

US 2004/0195950 A1    Oct. 7, 2004

(30) Foreign Application Priority Data

Dec. 26, 2002   (KR) ............... 10-2002-0084160

(51) Int. Cl.
*H01J 63/04*   (2006.01)
(52) U.S. Cl. ............ 313/495; 313/496; 313/497; 313/309; 313/310; 313/311
(58) Field of Classification Search ........ 313/309–310, 313/495, 496–497
See application file for complete search history.

(56) References Cited

U.S. PATENT DOCUMENTS

| | | | | |
|---|---|---|---|---|
| 5,892,323 | A * | 4/1999 | Zimmerman | 313/495 |
| 6,028,391 | A * | 2/2000 | Makishima | 313/310 |
| 6,062,931 | A * | 5/2000 | Chuang et al. | 445/24 |
| 6,239,547 | B1 * | 5/2001 | Uemura et al. | 313/495 |
| 6,333,598 | B1 * | 12/2001 | Hsu et al. | 313/495 |
| 6,417,606 | B1 * | 7/2002 | Nakamoto et al. | 313/336 |
| 6,455,989 | B1 * | 9/2002 | Nakada et al. | 313/309 |
| 6,504,292 | B1 * | 1/2003 | Choi et al. | 313/310 |
| 6,525,468 | B1 * | 2/2003 | Wada et al. | 313/495 |
| 6,541,906 | B2 * | 4/2003 | Lee et al. | 313/495 |
| 6,653,366 | B1 * | 11/2003 | Imai et al. | 523/160 |
| 6,866,801 | B1 * | 3/2005 | Mau et al. | 264/29.1 |
| 6,885,142 | B2 * | 4/2005 | Ito | 313/477 R |
| 6,914,372 | B1 * | 7/2005 | Akiyama et al. | 313/309 |
| 6,919,730 | B2 * | 7/2005 | Cole et al. | 324/715 |
| 2001/0006232 | A1 * | 7/2001 | Choi et al. | 257/10 |
| 2002/0070648 | A1 * | 6/2002 | Forsberg | 313/309 |
| 2002/0175617 | A1 * | 11/2002 | Lee et al. | 313/495 |
| 2002/0175618 | A1 * | 11/2002 | Lee et al. | 313/495 |
| 2003/0127965 | A1 * | 7/2003 | Uemura et al. | 313/495 |

FOREIGN PATENT DOCUMENTS

JP      2002100282 A   *   4/2002
JP      2002100828 A   *   4/2002

* cited by examiner

*Primary Examiner*—Joseph Williams
*Assistant Examiner*—Hana A Sanei
(74) *Attorney, Agent, or Firm*—Robert E. Bushnell, Esq.

(57) ABSTRACT

A field emission display includes first and second substrates provided opposing one another with a predetermined gap therebetween; electron emission sources provided on one of the first and second substrates; an electron emission inducing assembly for inducing the emission of electrons from the electron emission sources; and an illuminating assembly provided on the substrate on which the electron emission sources are not formed, the illuminating assembly realizing images by the emission of electrons from the electron emission sources. The electron emission sources include a carbon nanotube layer and a base layer, the base layer connecting the carbon nanotube layer to the substrate and applying a voltage to the carbon nanotube layer required for the emission of electrons. Also, the carbon nanotube layer is provided on the base layer in a state substantially un-mixed with the base layer.

10 Claims, 9 Drawing Sheets

FIELD EMISSION DISPLAY INCLUDING ELECTRON EMISSION SOURCE FORMED IN MULTI-LAYER STRUCTURE

CLAIM OF PRIORITY

This application makes reference to, incorporates the same herein, and claims all benefits accruing under 35 U.S.C. §119 from an application entitled "FIELD EMISSION DISPLAY INCLUDING ELECTRON EMISSION SOURCE FORMED IN MULTI-LAYER STRUCTURE" earlier filed in the Korean Intellectual Property Office on 26 Dec. 2002 and there duly assigned Serial No. 2002-84160.

BACKGROUND OF THE INVENTION

1. Field of the Invention

The present invention relates to a field emission display, and more particularly, to a field emission display including electron emission sources that use carbon nanotubes.

2. Description of the Related Art

The first field emission displays (FEDs) used Spindt-type electron emission sources, in which a material such as molybdenum or silicon is layered and formed to a sharp point at multiple locations. However, Spindt-type electron emission sources make manufacture complicated as a result of their microscopic configuration, and require highly precise manufacturing technology. These factors make application of Spindt-type electron emission sources to display devices of a large screen size difficult.

Therefore, there is an ongoing effort to simplify manufacture and make production of display devices having a large screen size easy by forming flat electron emission sources by using carbon-based materials.

Carbon-based materials suitable for forming electron emission sources include graphite, diamond-like carbon (DLC), and carbon nanotubes. Among these, carbon nanotubes appear to be very promising for use as electron emission sources. This is because carbon nanotubes have extremely minute tips with a radius of curvature of approximately tens to several tens of nanometers, and because carbon nanotubes are able to emit electrons while in a low electric field of about 1~10V/µm.

Electron emission sources using carbon nanotubes are typically formed using a screen printing method. In the screen printing method, a paste mixture in which carbon nanotube powder, frit, and a vehicle are combined is screen-printed on cathode electrodes, then the mixture is heat treated to evaporate organic elements within the mixture. Next, the frit is fused such that carbon nanotubes are adhered to the cathode electrodes.

With the use of the screen printing method, manufacture is simple and application to large-screen display devices is possible. However, the electron emission sources formed using the screen printing method are such that most of the carbon nanotubes are embedded in solid granules of the paste and fail to protrude from a surface of the electron emission sources.

Figure 15:
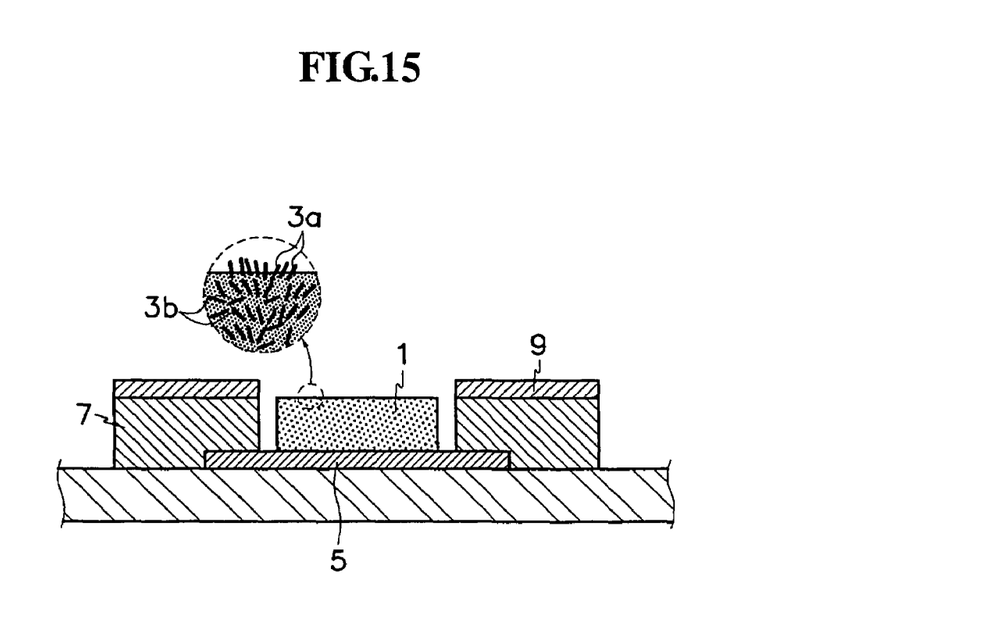
FIG. 15 is a schematic view of an electron emission source formed using conventional methods.

FIG. 15 shows a schematic view of an electron emission source formed using the screen printing method. Carbon nanotubes 3a and 3b are shown in detail. Although the carbon nanotubes 3a protrude from the surface of the conventional electron emission source 1, the carbon nanotubes 3b (i.e., most of the carbon nanotubes) are embedded in the solid granules. The carbon nanotubes 3b embedded in the solid granules are unable to perform electron emission. Reference numeral 5 in the drawing refers to a cathode electrode, reference numeral 7 to insulating layers, and reference numeral 9 to gate electrodes.

Figure 16:
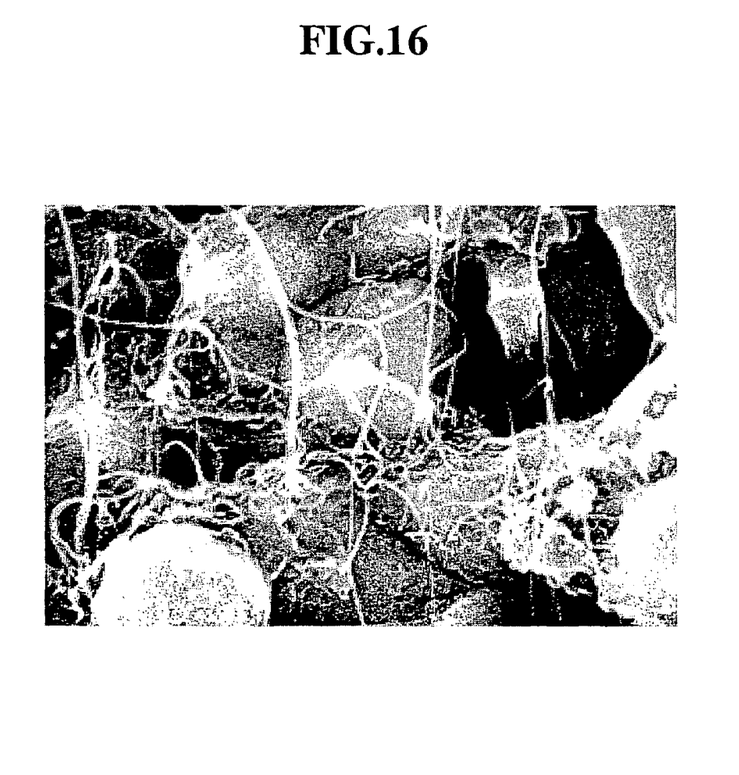
FIG. 16 is a scanning electron microscope photograph of an internal cross section of an electron emission source formed using conventional methods.

FIG. 16 is a scanning electron microscope photograph of an internal cross section of an electron emission source formed using the screen printing method. In the photograph, the spherical materials are solid granules. The thin carbon nanotubes are shown embedded within the solid granules.

Therefore, with the use of conventional electron emission sources using carbon nanotubes, the desired amount of electron emission for a certain level of the electric field generated in the peripheries of the electron emission sources is not obtained. To realize the desired level of electron emission, a higher voltage must be applied, that is, a higher overall drive voltage is needed. In addition to the greater power consumed, the application of a high voltage results in a reduction in the lifespan of the electron emission sources.

SUMMARY OF THE INVENTION

It is one object of the present invention to provide a field emission display, in which a larger number of carbon nanotubes are made to protrude from a surface of electron emission sources to thereby increase the amount of electron emission, reduce a drive voltage, and increase a lifespan of the electron emission sources.

It is another object of the present invention to provide a field emission display that is easy to manufacture and is efficient.

It is yet another object of the present invention to provide a simplified manufacture and make production of display devices having a large screen size easy by forming flat electron emission sources.

In one embodiment, the present invention provides a field emission display including first and second substrates provided opposing one another with a predetermined gap therebetween to form a vacuum assembly; electron emission sources provided on one of the first and second substrates; an electron emission inducing assembly for inducing the emission of electrons from the electron emission sources; and an illuminating assembly provided on one of the first and second substrates, that is, the substrate on which the electron emission sources are not formed, the illuminating assembly realizing images by the emission of electrons from the electron emission sources. The electron emission sources include a carbon nanotube layer and a base layer, the base layer connecting the carbon nanotube layer to the substrate on which the electron emission sources are provided and having conductibility for applying a voltage to the carbon nanotube layer required for the emission of electrons, and the base layer has a predetermined thickness. Also, the carbon nanotube layer is provided on the base layer in a state substantially un-mixed with the base layer.

The base layer includes an adhesive material which is at least one selected from the group including PbO, $SiO_2$, and $Ba_2O_3$; and a metal conductive material selected from the group including silver, copper, and aluminum. Also, the base layer may be realized through an adhesive material having conductibility such as silver, nickel, aluminum, gold, cobalt, and iron.

Preferably, the base layer has an outer surface that includes prominences and depressions. To realize such a configuration, the base layer includes spherical particles with a diameter of 0.05~5 µm (microns or micrometers), or includes a thin film having prominences and depressions at an interval of 1~20 µm, a depth of 0.01~5 µm and a width of 0.05~10 µm.

The spherical particles are conductive metal particles selected from the group including silver, copper, and aluminum, and the thin film is formed of indium tin oxide or chrome.

Preferably, a carbon nanotube density of the carbon nanotube layer is 100~1,000,000 times a carbon nanotube density of the base layer, and the base layer is formed at a thickness of 0.05~5 μm.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Preferred embodiments of the present invention will now be described in detail with reference to the accompanying drawings.

Figure 1:
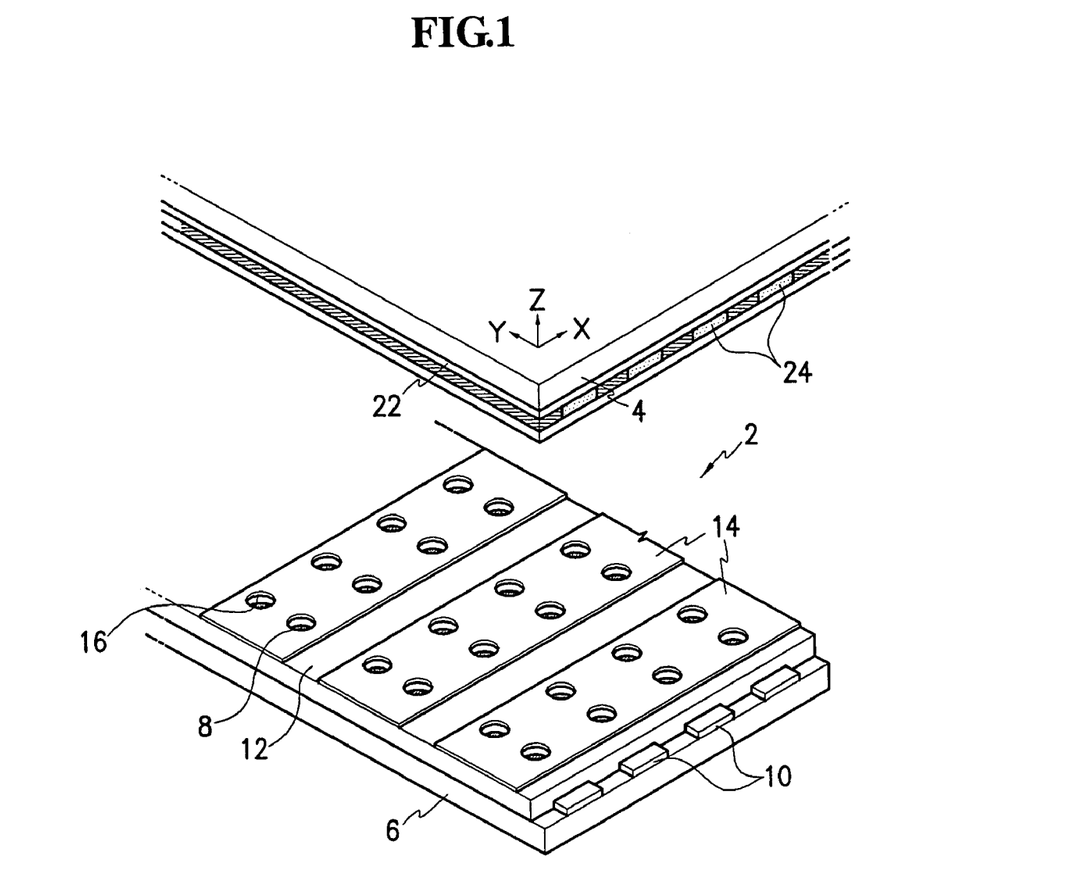
FIG. 1 is a partial exploded perspective view of a field emission display according to a first preferred embodiment of the present invention.
Figure 2:
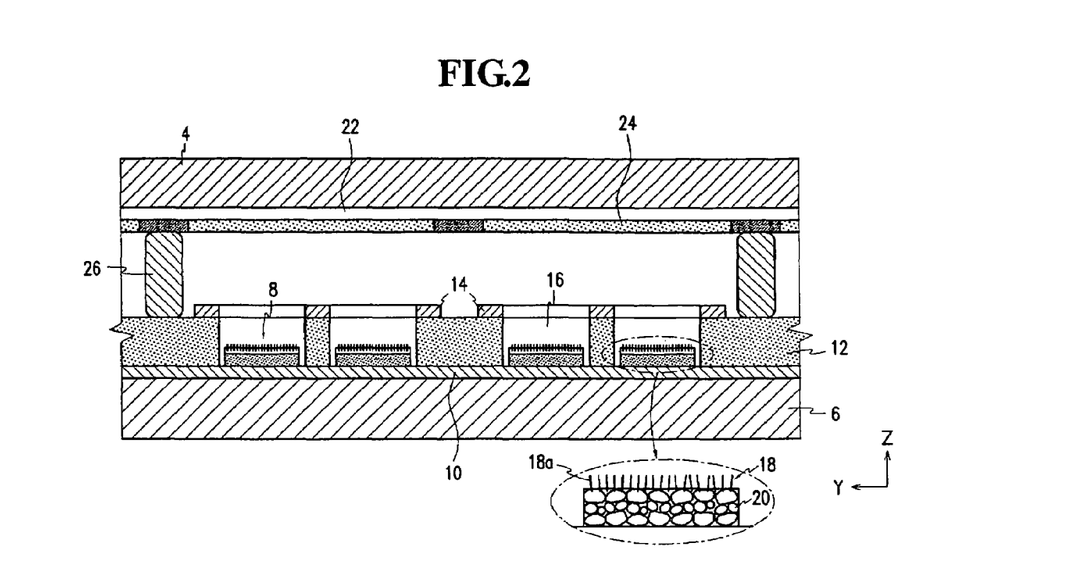
FIG. 2 is a partial sectional view of a field emission display according to a first preferred embodiment of the present invention.

FIG. 1 is a partial exploded perspective view of a field emission display according to a first preferred embodiment of the present invention, and FIG. 2 is a partial sectional view of a field emission display according to a first preferred embodiment of the present invention.

A field emission display (FED) 2 includes a front substrate 4 and a rear substrate 6, which are provided opposing one another with a predetermined gap therebetween to thereby form a vacuum assembly. Electron emission sources 8 and a structure for generating an electric field for the emission of electrons is provided on the rear substrate 6, and a structure to enable the realization of predetermined images by the emission of visible light by the electrons is provided on the front substrate 4.

In more detail, cathode electrodes 10 are formed on the rear substrate 6 in a stripe pattern along an axis Y direction. Further, an insulating layer 12 is formed on the rear substrate 6 covering the cathode electrodes 10, and gate electrodes 14 are formed on the insulating layer 12 in a stripe pattern along an axis X direction such that the gate electrodes 14 are perpendicular to the cathode electrodes 10.

Holes 16 that pass through the gate electrodes 14 and the insulating layer 12 are formed at areas where the cathode electrodes 10 and the gate electrodes 14 intersect (i.e., pixel areas). The electron emission sources 8, which are realized through carbon nanotubes, are formed on areas of the cathode electrodes 10 exposed by the holes 16. Each electron emission source 8 is insulated from the gate electrodes 14 by the insulating layer 12, with an uppermost portion of the holes 16 (in an axis Z direction) being formed by the gate electrodes 14 to surround and encompass an area above the electron emission sources 8.

Each of the electron emission sources 8 includes a carbon nanotube layer 18 and a base layer 20. The base layer 20 connects the carbon nanotube layer 18 with the corresponding cathode electrode 10, and has a certain degree of conductibility to enable the application of a voltage required for electron emission. The carbon nanotube layer 18 is provided on the base layer 20 with substantially no mixture of materials that form these two elements.

The base layers 20 include adhesive material and conductive material to exhibit adhesive and conductive properties, and are formed on the cathode electrodes 10 at a predetermined thickness of preferably 0.05~5 μm. The adhesive material is a glass frit that selected from PbO, $SiO_2$, $Ba_2O_3$, or a mixture thereof, and is fused by baking such that carbon nanotubes 18a are adhered to the cathode electrodes 10. Metal may be used for the conductive material. Preferably, a metal such as silver (Ag), copper (Cu), and aluminum (Al) is used as the conductive material of the base layers 20. With the thickness of the base layer under 0.05 microns, carbon nanotubes are easily detached from the base layer after activation of the electron emission sources because adhesion of the carbon nanotube layer to the base layer is weak. With the thickness of the base layer over 5 microns, the field emission effect of the carbon nanotube layer by the cathode electrode is deteriorated. Furthermore, when the base layer includes glass frit as an adhesive material, the field emission effect of the carbon nanotube layer is further deteriorated due to the non-conductivity of the glass frit.

After baking of the base layers 20 that include an adhesive material and a conductive material as described above, solid granules are left remaining. The carbon nanotubes 18a forming the carbon nanotube layers 18 are configured such that one end is attached to the corresponding base layer 20 while the opposite end protrudes from the corresponding base layer 20 in a direction away from the electron emission sources 8.

The base layers 20 may be formed including only conductive material, or may be formed of a conductive material having adhesive properties as silver (Ag), nickel (Ni), aluminum (Al), gold (Au), cobalt (Co), and iron (Fe).

Since the base layers 20 and carbon nanotube layers 18 are artificially separated in this manner, and the carbon nanotubes 18a are significantly lighter in weight than the particles of the metal such as silver forming the base layers 20, the penetration of the individual carbon nanotubes 18a forming the carbon nanotube layers 18 into the base layers 20 is minimized. The end result is that a density of the carbon nanotubes 18a of the carbon nanotube layers 18 is 100~1,000,000 times a density of the carbon nanotubes 18a of the base layers 20.

With the separated structure of the base layers 20 and carbon nanotube layers 18 in the electron emission sources 8, the carbon nanotubes 18a are protruded from the surface of the electron emission sources 8 rather than being embedded in the base layers 20. As a result, an increase in the number of the carbon nanotubes 18a protruded from the surface of the electron emission sources 8 is realized, and the emission of electrons occurs more easily from tips of the carbon nanotubes 18a protruded in this manner.

Formed on the front substrate 4 are a transparent anode electrode 22 that applies a high voltage (approximately 5~10 kV (kilovolts)) required for electron acceleration, and phosphor layers 24 that are excited by electrons to emit visible light. Spacers 26 are provided between the front substrate 4 and the rear substrate 6 to maintain the predetermined cell gap therebetween.

If a predetermined DC (direct current) or AC (alternating current) voltage is applied between the cathode electrodes 10 and the gate electrodes 14, and a high voltage is applied to the anode electrode 22, electric fields are formed in peripheries of the electron emission sources 8 by the difference in voltage between the cathode electrodes 10 and the gate electrodes 14 such that electrons are emitted from the electron emission sources. The emitted electrons are attracted toward the high voltage applied to the anode electrode 22 to thereby strike corresponding phosphor layers 24. The phosphor layers 24 are illuminated as a result to realize predetermined images.

With the greater number of the carbon nanotubes 18a protruded from the surface of the electron emission sources 8, the electric fields are more easily concentrated to the ends of the carbon nanotubes 18a. Accordingly, the emission of electrons occurs from the ends of a greater number of the carbon nanotubes 18a to thereby increase the amount of electron emission. This improves brightness of the screen.

The electron emission sources 8 can be formed by an uneven surface of the base layers 20 or by making prominences (protrusions) and depressions in the surface of the base layers 20 to increase surface areas of the same such that the density of the carbon nanotubes 18a, which are provided on the base layers 20, is further increased.

Figure 3:
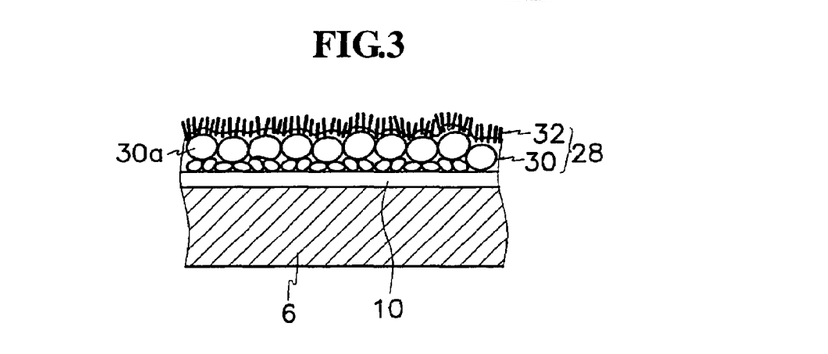
FIGS. 3 and 4 are schematic views of electron emission sources according to modified examples of the first preferred embodiment of the present invention.

In one modified example of the first preferred embodiment of the present invention, with reference to FIG. 3, base layers 30 of electron emission sources 28 include spherical particles 30a having a diameter of 0.05~5 μm, and the base layers 30 have an uneven outer surface as a result of the spherical particles 30a. The carbon nanotube layer 32 also has an uneven outer surface as a result of the spherical particles 30a. The spherical particles 30a are preferably formed of conductive material such as silver, copper, and aluminum. In addition to the conductive particles, the base layers 30 may also include adhesive material such as glass frit. With the diameter of spherical particles under 0.05 microns, the base layer is too dense to leave sufficient place to vertically dispose the carbon nanotubes. Therefore, the field emission effect of the carbon nanotube layer is deteriorated. With the diameter of spherical particles over 5 microns, the surface area of spherical particles that are irrelevant to the field emission of the carbon nanotube layer become much larger. Therefore, the field emission effect of the carbon nanotube layer is also deteriorated.

Figure 4:
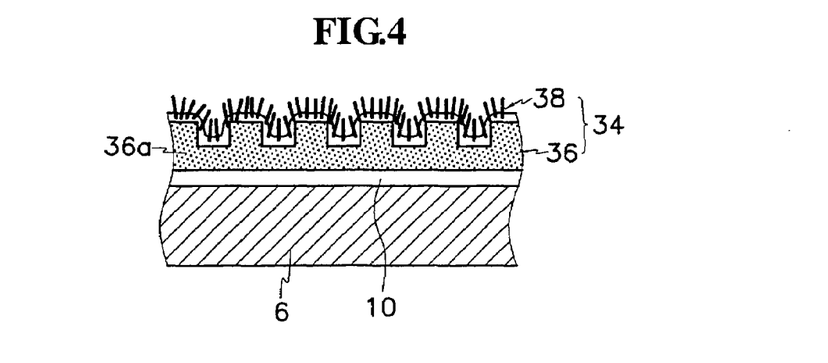

In another modified example of the first preferred embodiment of the present invention, with reference to FIG. 4, base layers 36 of electron emission sources 34 may include thin films 36a that have formed prominences and depressions at 0.05~10 micron width, 0.01~5 micron depth and 1~20 micron intervals. The width is related to a structure of the cathode electrode, and there is a minimum number of carbon nanotubes in each electron emission source in order to secure the intervals of the cathode electrodes and resolution. The range of width is derived from the above fact. Furthermore, considering the width, the minimum range of the interval is 1 micron. The depth is related to the field emission effect of the carbon nanotube layer. With the depth under 0.01 microns, the field emission does not reach the carbon nanotubes. The thin films 36a are made of a conductive material such as ITO (indium tin oxide) and chrome, and the prominences and depressions of the thin films 36a may be formed using conventional photolithography process. The base layers 36 and the carbon nanotube layer 38 also have uneven outer surfaces as a result of the prominences and depressions of the thin film 36a.

Figure 5:
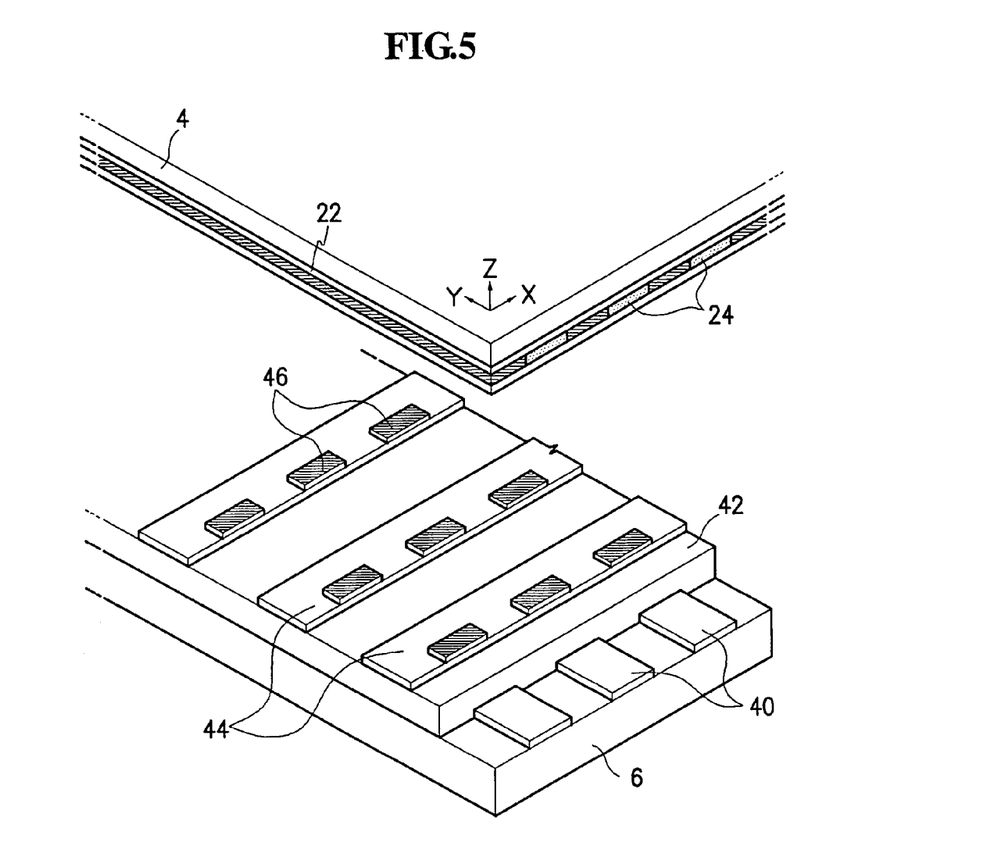
FIG. 5 is a partial exploded perspective view of a field emission display according to a second preferred embodiment of the present invention.
Figure 6:
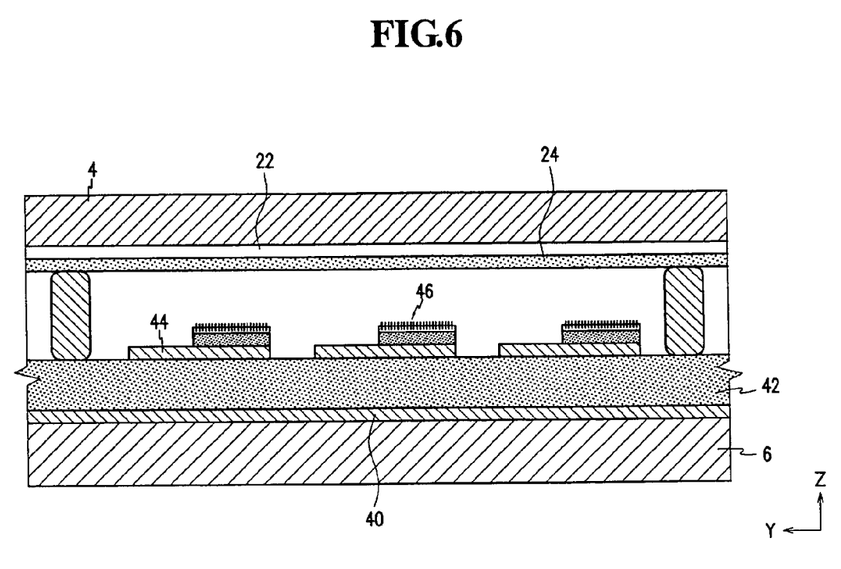
FIG. 6 is a partial sectional view of a field emission display according to a second preferred embodiment of the present invention.

An electrode structure for forming electric fields in the peripheries of the electron emission sources may be realized as described below. FIG. 5 is a partial exploded perspective view of a field emission display according to a second preferred embodiment of the present invention, and FIG. 6 is a partial sectional view of a field emission display according to a second preferred embodiment of the present invention. A structure of a front substrate 4 is identical to that of the first preferred embodiment of the present invention, so only a structure of a rear substrate 6 will be described.

Gate electrodes 40 are formed on the rear substrate 6 in a stripe pattern along an axis Y direction, and an insulating layer 42 is formed over an entire surface of the rear substrate 6 covering the gate electrodes 40. Cathode electrodes 44 are formed on the insulating layer 42 in a stripe pattern in an axis X direction such that the cathode electrodes 44 are perpendicular to the gate electrodes 40. Further, electron emission sources 46 are formed at areas where the cathode electrodes 44 and the gate electrodes 40 intersect (i.e., in pixel areas). That is, the electron emission sources 46 are formed in each of the pixel areas on the cathode electrodes 44.

If a predetermined DC or AC voltage is applied between the gate electrodes 40 and the cathode electrodes 44, electric fields are formed in peripheries of the electron emission sources 46 by a difference in voltage between the gate electrodes 40 and the cathode electrodes 44. Since a structure of the electron emission sources 46 is identical to that of the first preferred embodiment, a detailed description thereof will not be provided.

A method of forming the electron emission sources will now be described with reference to FIGS. 7 through 11.

Figure 7:
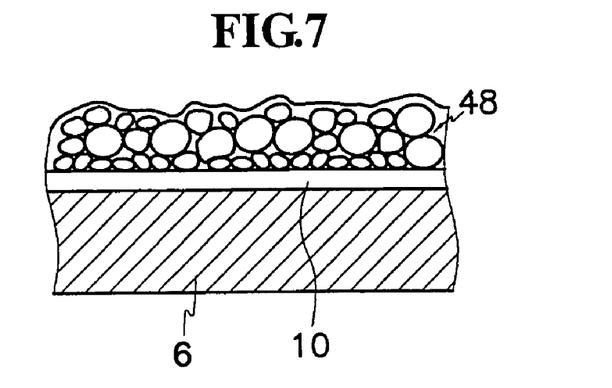
FIGS. 7 through 11 are schematic views showing sequential steps in forming an electron emission source according to the present invention.

Initially, as shown in FIG. 7, a first mixture 48, in which an adhesive material, a conductive material, and a vehicle are mixed, is screen-printed and dried on the cathode electrodes 10. Preferably, the adhesive material is a glass frit that selected from PbO, $SiO_2$, $Ba_2O_3$, or a mixture thereof, and the conductive material is a powdered metal of silver, copper, aluminum, etc. The first mixture 48 may also be realized through a conductive material or an adhesive material having conductibility. Silver, nickel, aluminum, gold, cobalt, and iron may be used for the adhesive material having conductibility.

The vehicle is a material that acts to adjust a viscosity, concentration, etc. of a composition to allow for easy printing. Typical examples include an agent for giving adhesion, a binder, and a solvent. For example, a silicon group material may be used as an agent for giving adhesion;

acryl resin and epoxy resin may be used as a binder; and ethyl cellulose, terpineol, and butyl carbitol acetate may be used as a solvent.

Figure 8:
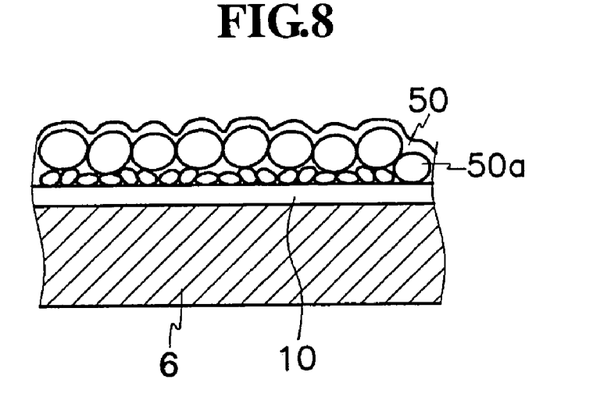

On the other hand, with reference to FIG. 8, in the case where a first mixture 50 includes conductive particles 50*a* of a particle diameter of 0.05~5 μm, for example, conductive particles of silver, copper, or aluminum, the first mixture 50 realizes an uneven outer surface by the conductive particles 50*a*.

Figure 9:
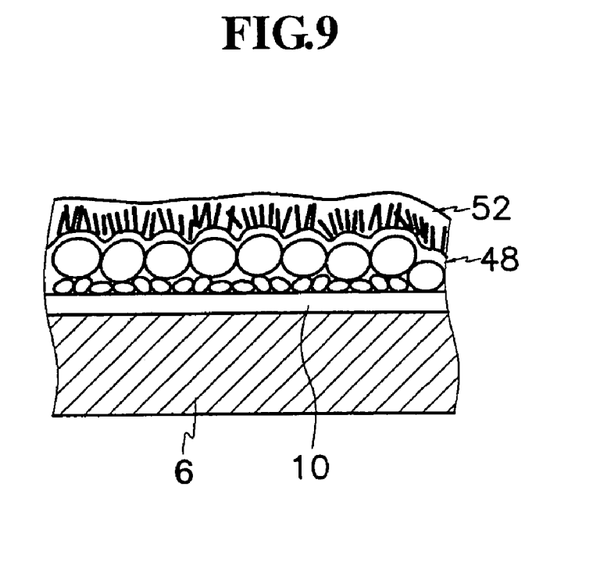

Next, with reference to FIG. 9, a second mixture 52 including carbon nanotube powder and a vehicle is screen printed then dried on the first mixture 48. The dried first and second mixtures 48 and 52 are baked for 5~60 minutes at a temperature between 300 and 500° C.(degrees Celsius). This burns and removes organic elements in the first and second mixtures 48 and 52 to thereby realize the electron emission sources 8 formed of the base layers 20 and carbon nanotubes 18*a* of FIG. 2.

In the baking process, adhesive material of the first mixture 48 is fused, and organic elements in both the first and second mixtures 48 and 52 are removed such that most of the carbon nanotubes 18*a* are provided with one end adhered to the corresponding base layer 20 and their other end protruding from the surface of the electron emitting sources 8.

Further, the first mixture 48 and the second mixture 52 may further include a photosensitive resin and a photoinitiator. In this case, after screen printing of the first and second mixtures 48 and 52 on the rear substrate 6, infrared rays are selectively irradiated on portions where it is desired to form the electron emission sources 8 to harden portions of the first and second mixtures 48 and 52. Areas that are not hardened in this process are then removed to thereby realize the electron emission sources 8 in the desired areas.

In the case where the electron emission sources 34 include the thin films 36*a* as shown in FIG. 4, the formation of the electron emission sources 34 is realized as follows.

Figure 10:
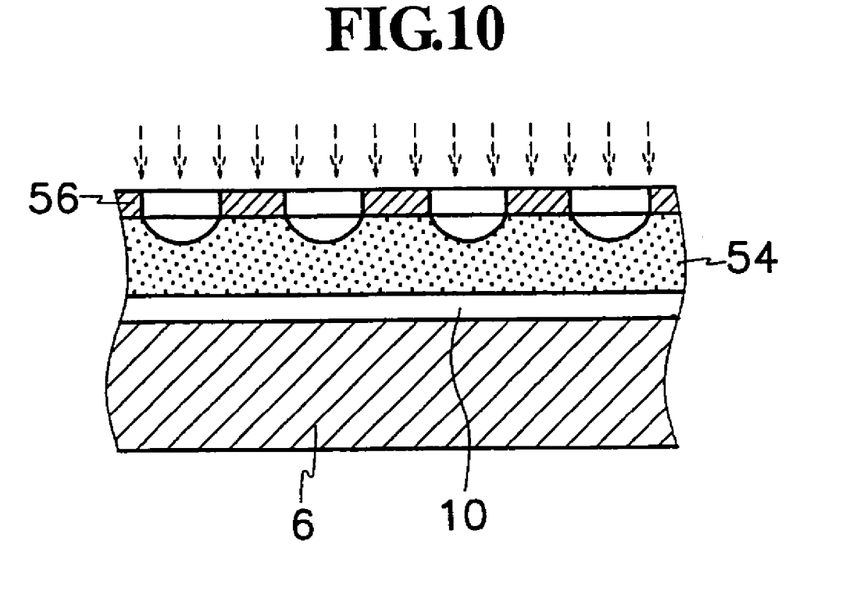
Figure 11:
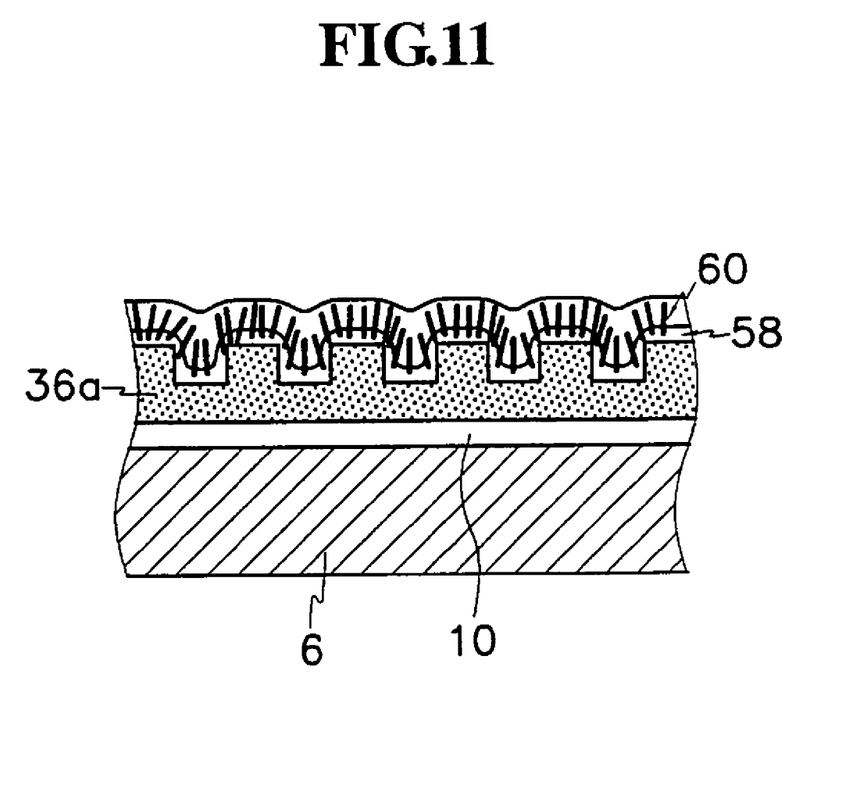

First, with reference to FIG. 10, a conductive film 54 made of ITO, chrome, etc. is coated on the cathode electrodes 10, a photoregister 56 is coated on the conductive film 54 at a thickness of 1~5 μm, then the photoresist 56 is patterned at 1~20 μm intervals to expose portions of the conductive film 54. Subsequently, an etching solution (indicated by the arrows) is used to etch exposed portions of the conductive film 54 to thereby result in the thin film 36*a* that has formed thereon prominences and depressions at intervals of 1~20 μm, 0.05~10 μm width and a depth of 0.01~5 μm as shown in FIG. 11.

Next, a first mixture 58, in which an adhesive material and a vehicle are mixed, is screen printed and dried on the thin film 36*a*, then a second mixture 60 including carbon nanotube powder and a vehicle is screen printed and then dried on the first mixture 58. The dried first and second mixtures 58 and 60 are baked for 5~60 minutes at a temperature between 300 and 500° C. to thereby remove organic elements in the first and second mixtures 58 and 60. This completes the formation of the electron emission sources 34 as shown in FIG. 4.

Figure 12:
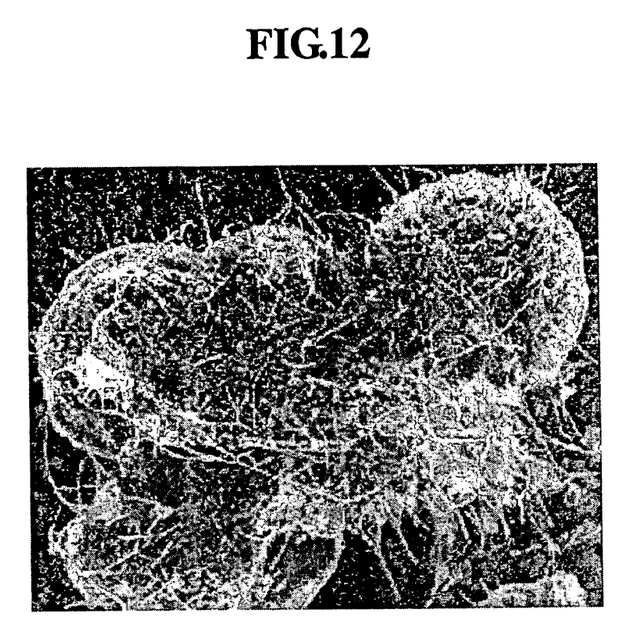
FIGS. 12 and 13 are scanning electron microscope photographs showing a plan view and a side view, respectively, of an electron emission source according to the present invention.
Figure 13:
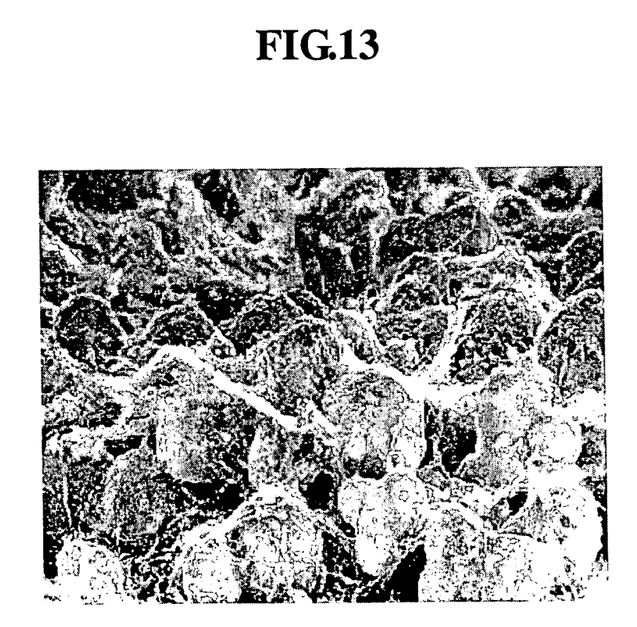

FIGS. 12 and 13 are scanning electron microscope photographs showing a plan view and a side view, respectively, of an electron emission source in which silver particles are contained in a base layer. In the photographs, the spherical elements are silver particles, and thin carbon nanotubes can be seen protruding from the surface of the silver particles.

Figure 14:
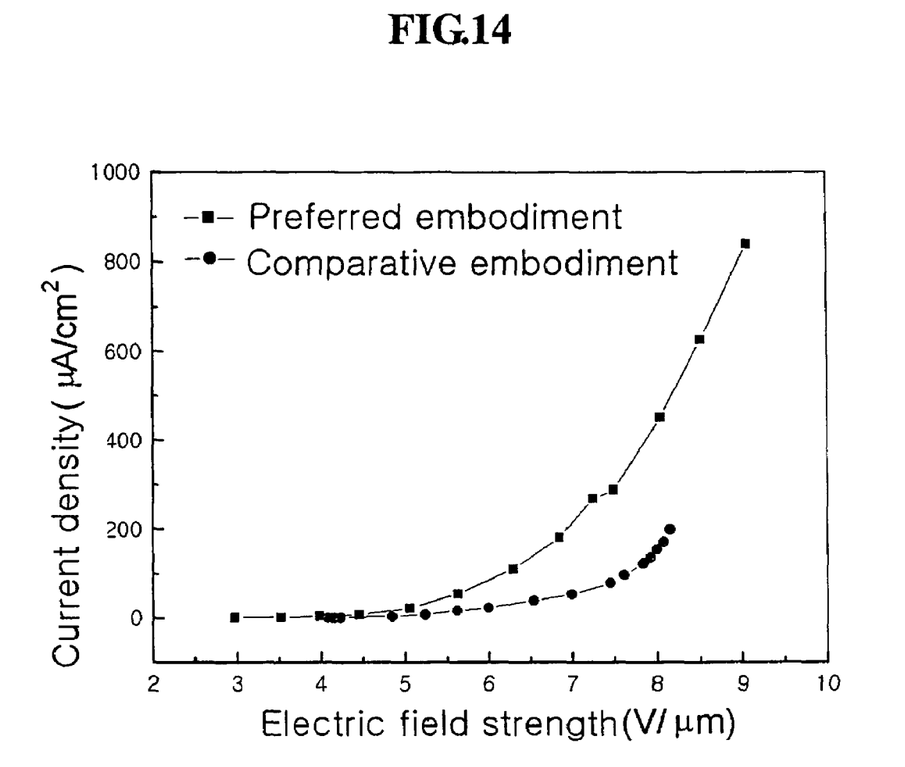
FIG. 14 is a graph showing a relation between a current density and electric field strength of electron emission sources of the present invention and of the prior art.

FIG. 14 is a graph showing a relation between a current density and electric field strength of electron emission sources of the present invention (preferred embodiment) and of the prior art (comparative example). The electron emission source of FIG. 12 was used as the electron emission source of the preferred embodiment, while the electron emission source of FIG. 16 was used as the electron emission source for the comparative example. The horizontal axis in the graph represents a strength of an electric field applied to the electron emission sources and the vertical axis a current density.

As shown in the graph of FIG. 14, as a result of a larger number of carbon nanotubes protruding from the surface of the electron emission source in the preferred embodiment, a significantly higher current density at the same electric field intensity is realized over the comparative example. With the application of 7.5V (volts), the current density of the preferred embodiment is approximately four times that of the comparative example.

In the FED of the present invention structured as in the above, a larger number of carbon nanotubes may be protruded from the surface of the electron emission sources. Accordingly, electron emission amounts are increased for the same electric field intensities to thereby improve screen brightness, and enable the desired electron emission amount with a lower drive voltage so that less power is needed to run the FED. This also prevents the application of an excessive voltage to the electron emission sources such that a lifespan of the same is increased.

Although preferred embodiments of the present invention have been described in detail hereinabove, it should be clearly understood that many variations and/or modifications of the basic inventive concepts herein taught which may appear to those skilled in the present art will still fall within the spirit and scope of the present invention, as defined in the appended claims.

What is claimed is:

1. A field emission display, comprising:
   first and second substrates provided opposing one another with a predetermined gap therebetween to form a vacuum assembly;
   electron emission sources provided on one of the first and second substrates;
   an electron emission inducing assembly inducing the emission of electrons from the electron emission sources; and
   an illuminating assembly provided on the other one of the first and second substrates not including the electron emission sources being formed, the illuminating assembly realizing images by the emission of electrons from the electron emission sources,
   with the electron emission sources including a carbon nanotube layer and a base layer, said base layer having an outer surface that includes prominences and depressions, the base layer formed between the carbon nanotube layer and the one of the first and second substrates on which the electron emission sources are provided and having conductibility for applying a voltage to the carbon nanotube layer required for the emission of electrons, the carbon nanotube layer comprising a plurality of carbon nanotubes, and
   with the base layer having a predetermined thickness, and the carbon nanotube layer being provided on the base layer in a state substantially un-mixed with the base layer, the carbon nanotubes formed on both of the prominences and the depressions,
   wherein the base layer comprises:
   an adhesive material realized through a glass frit that selected from the group consisting of PbO, $SiO_2$, $Ba_2O_3$, and a mixture thereof; and a metal conductive material selected from the group consisting of silver, copper, and aluminum.

2. The field emission display of claim 1, wherein the electron emission inducing assembly comprises:

cathode electrodes formed in a stripe pattern on one of the first and second substrates having the electron emission sources provided, the electron emission sources being provided on an outer surface of the cathode electrodes;

an insulating layer formed covering the cathode electrodes at all areas except where the electron emission sources are formed; and gate electrodes formed on the insulating layer in a stripe pattern and in a direction. substantially perpendicular to the cathode electrodes, the gate electrodes including holes for exposing the electron emission sources.

3. The field emission display of claim 1, wherein the electron emission inducing assembly comprises:

gate electrodes formed in a stripe pattern on one of the first and second substrates provided with the electron emission sources;

an insulating layer formed over an entire surface of one of the first and second substrates provided with the electron emission sources and covering the gate electrodes; and cathode electrodes formed on the insulating layer in a stripe pattern and in a direction substantially perpendicular to the gate electrodes, the electron emission sources being formed on an outer surface of the cathode electrodes.

4. The field emission display of claim 1, wherein the illuminating assembly comprises:

an anode electrode formed on the substrate on which the electron emission sources are not formed; and phosphor layers formed on an outer surface of the anode electrode.

5. The field emission display of claim 1, wherein the base layer includes spherical particles with a diameter of 0.05 to 5 $\mu$m below the carbon nanotube layer.

6. The field emission display of claim 5, wherein the spherical particles are conductive metal particles selected from the group consisting of silver, copper, and aluminum.

7. The field emission display of claim 1, further comprising a thin film formed between the base layer and the one of the first and second substrates, the thin film having prominences and depressions, the prominences of the thin film having 0.05 to 10 $\mu$m width, 0.01 to 5 $\mu$m depth and 1 to 20 $\mu$m intervals.

8. The field emission display of claim 7, wherein the thin film is formed of indium tin oxide or chrome.

9. The field emission display of claim 1, wherein a carbon nanotube density of the carbon nanotube layer is 100 to 1,000,000 times a carbon nanotube density of the base layer.

10. The field emission display of claim 1, wherein the base layer is formed at a thickness of 0.05 $\mu$m to 5 $\mu$m.

* * * * *